United States Patent [19]

Bruhn

[11] Patent Number: 5,279,356
[45] Date of Patent: Jan. 18, 1994

[54] WASTE HEAT RECOVERY SYSTEM

[75] Inventor: Alfred Bruhn, Eastchester, N.Y.

[73] Assignee: American Hydrotherm Corporation, New York, N.Y.

[21] Appl. No.: 646,141

[22] Filed: Jan. 25, 1991

Related U.S. Application Data

[63] Continuation of Ser. No. 287,711, Dec. 21, 1988, abandoned.

[51] Int. Cl.$^5$ .................. F22D 1/00; F28F 27/02; F02C 6/18
[52] U.S. Cl. .................................. 165/47; 165/909; 165/103; 165/901; 60/39.182; 122/7 R
[58] Field of Search .................. 60/39.182, 670; 122/7 R, DIG. 2; 168/39; 165/40, 921, 909, 47

[56] References Cited

U.S. PATENT DOCUMENTS

| | | | |
|---|---|---|---|
| 1,052,269 | 2/1913 | Patterson | 60/670 |
| 3,177,659 | 4/1965 | Berman | 60/39.182 |
| 3,396,781 | 8/1968 | Whetmore | 165/140 |
| 4,012,191 | 3/1977 | Lisankie et al. | 122/DIG. 2 |
| 4,173,254 | 11/1979 | Paull et al. | 60/670 |
| 4,185,685 | 1/1980 | Giberson | 165/909 |
| 4,196,776 | 4/1980 | Fallon, Jr. et al. | 165/909 |
| 4,300,920 | 11/1981 | Grove | 165/921 |
| 4,353,207 | 10/1982 | Lee | 60/39.182 |
| 4,380,147 | 4/1983 | Zaba | 60/39.182 |
| 4,449,569 | 5/1984 | Lisi et al. | 165/40 |

FOREIGN PATENT DOCUMENTS 148041 7/1920 United Kingdom ............ 165/39

*Primary Examiner*—John K. Ford
*Attorney, Agent, or Firm*—Louis E. Marn

[57] ABSTRACT

These and other objects of the present invention are achieved in a heat recovery system to recover the heat potential and including a plurality of heat exchanger assemblies from exhaust or waste gas at a temperature of from 500 to 2500° F. wherein the heat exchanger assemblies include induced draft fans for controlling the flow of exhaust or waste gas therethrough as a heating medium for diverse fluids passing in indirect heat transfer relationship at descending temperature levels.

6 Claims, 1 Drawing Sheet

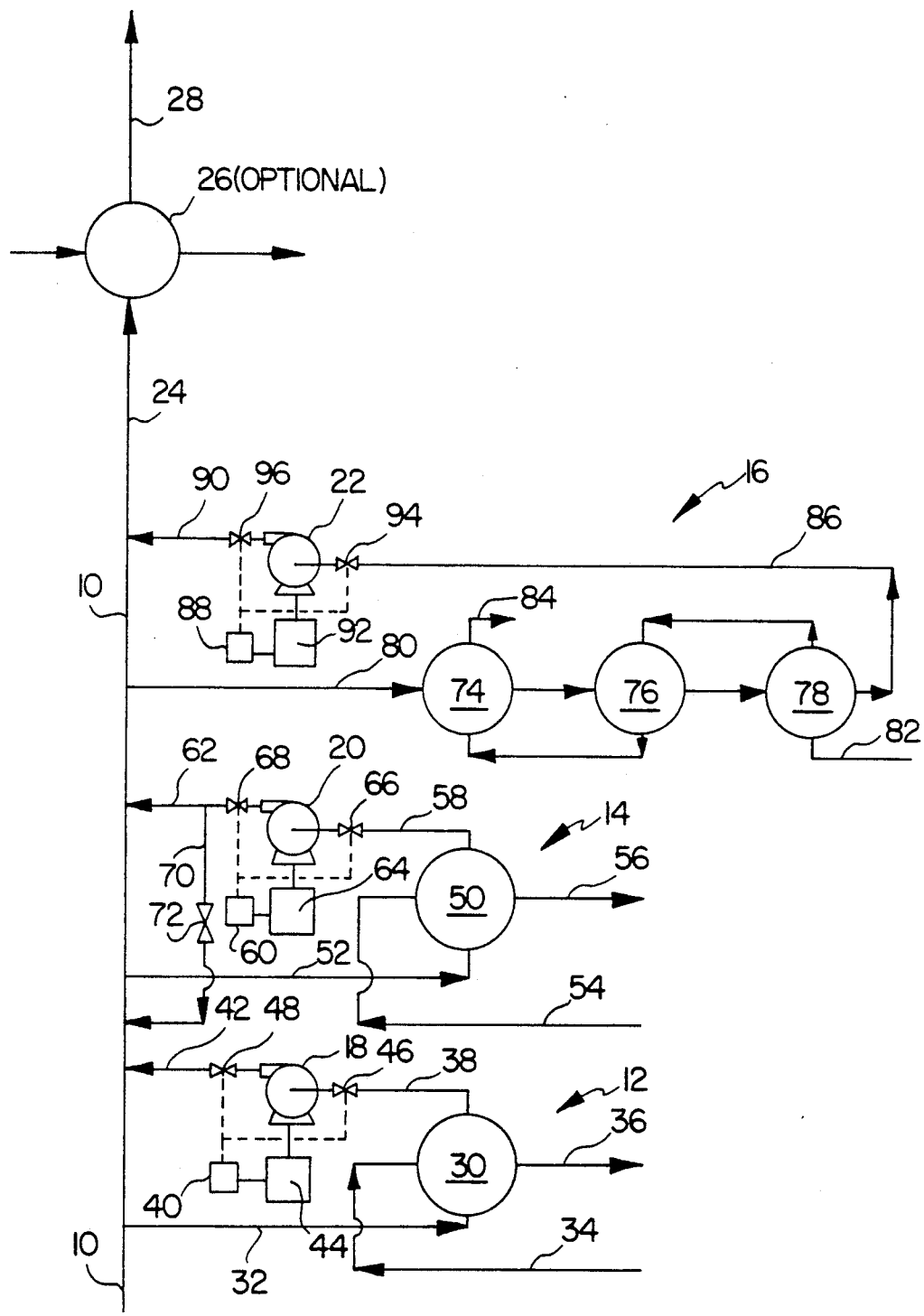

WASTE HEAT RECOVERY SYSTEM

This is a continuation application Ser. No. 07/287,711, filed Dec. 21, 1988 now abandoned.

BACKGROUND OF THE INVENTION (1) Field of the Invention

This invention relates to the recovery of waste heat, and more particularly to an apparatus for the recovery of heat from high temperature gas stream.

(2) Description of the Prior Art

Cogeneration and heat recovery systems normally recover heat from hot gases leaving a gas turbine, gas engine, or other source of hot gas by generating steam which is used for process or space heating, for driving a steam turbine and generating electricity or for driving a pump or compressor. Infrequently, a high temperature hot oil stream is used to recover heat and transfer the heat to other streams via heat exchangers.

A frequent application of heat recovery systems is one which hot gases leaving a gas turbine in the range of 800° to 950° F. produces power at a steady rate which is sold to a local power company, split between the power company and operating company or used by the operating company. Generally, there is an excess of heat available or the heat uses vary depending on plant operation, and therefore, some of the hot gases by-pass the heat recovery system via expensive and somewhat unreliable large by-pass stack damper. An expensive and complex control system is required to automatically modulate the opening of such damper, and in the case of failure of the by-pass system, steam pressure will rise to elevated pressures and/or the heat transfer oil will rise to an elevated temperature requiring automatic shutdown of the gas turbine or the source of the hot gases.

In a hot oil recovery unit, heat transfer design is very complex and expensive because oil will break down if its maximum film temperature (730° to 800° F.) is exceeded due to oil flow interruptions, gas flow interruptions or overfiring. Therefore, the capital cost is as high as is operating cost to replace or replenish the heat transfer oil.

In U.S. Pat. No. 4,257,579 to Bruhn et al. and assigned to the same assignee as the present invention, there is disclosed a waste heat recovery system using at least two heat exchange recovery systems utilizing intermediate heat transfer mediums for a process operation producing an exhaust or waste gas at temperatures of from 500° to 2500° F. wherein the heat exchanger assemblies may be fabricated using conventional materials of construction and wherein heat may be recovered at levels substantially higher than with the use of a single intermediate heat transfer medium, however, such systems depend upon using two or more heat recovery systems and each system has to have the ability to fully use all the heat that is recovered in each system.

OBJECTS OF THE PRESENT INVENTION

It is an object of the present invention to provide an improved apparatus for recovering heat from a high temperature gas stream.

Another object of the present invention is to provide an improved apparatus for recovering heat from a high temperature gas stream obviating any by-pass dampers requirements for balancing user requirements.

Still another object of the present is to provide an improved apparatus for recovering heat from a high temperature gas stream at reduced capital costs.

Yet another object of the present invention is to provide an improved apparatus for recovering heat from a high temperature gas stream of greater reliability.

A further object of the present invention is to provide an improved apparatus for recovering heat from a high temperature gas stream permitting wide ranges of operational flexibility of heating loads.

SUMMARY OF THE INVENTION

These and other objects of the present invention are achieved in a heat recovery system to recover the heat potential and including a plurality of heat exchanger assemblies from the exhaust or waste gas at a temperature of from 500° to 2500° F. wherein the heat exchanger assemblies include draft fans for controlling the flow of the exhaust or waste gas therethrough as a heating medium for diverse fluids passing in indirect heat transfer relationship at descending temperature levels.

BRIEF DESCRIPTION OF THE DRAWING

The invention will be more clearly understood by reference to the following description of an exemplary embodiment thereof when taken in conjunction with the accompanying drawing illustrating a schematic flow diagram thereof.

DETAILED DESCRIPTION OF THE INVENTION

Referring now to the drawing, a hot exhaust or waste gas stream at a temperature of from 500° to 2500° F. in line 10 is passed in indirect heat transfer relationship through a plurality of heat exchanger assemblies, generally indicated as 12, 14 and 16, including induced draft fans 18, 20 and 22, respectively, to recover the heat potential of the hot gas stream in line 10. After recovery of the heat potential in the heat exchanger assemblies 12, 14 and 16, a residual gas stream in line 24 may be passed through a heat exchanger 26 prior to venting to the atmosphere by line 28. The heat potential is recovered in the heat transfer assemblies 12, 14 and 16 by heating process streams therein at diverse temperature levels. It will be understood that generally only a portion of the gaseous flow in line 10 is to be passed through the heat exchanger assemblies 12, 14 and 16 as more fully hereinafter discussed.

The heat exchanger assembly 12 includes a heat exchanger 30 for passing in indirect heat transfer relationship a gas stream in line 32 in fluid flow communication with the line 10 with a process fluid, such as a cold heat transfer fluid introduced by line 34 into the heat exchanger 30. A heated fluid is withdrawn by line 36 from the heat exchanger 30 and is passed to an in-plant processing unit (not shown). The gas stream at a lower temperature level of from 650° to 750° F. is withdrawn by line 38 from the heat exchanger 30 and passes to the suction side of the induced draft fan 18 under the control of controller assembly 40 and returned by line 42 to line 10. The controller assembly 40 may control the speed of a motor 44 driving the induced draft fan 18, or alternately modulate gas flow in the inlet line 38 or the outlet line 42 to and from the induced draft fan 18 by a damper 46 or 48, respectively positioned in lines 38 or 42.

The heat exchanger assembly 14 includes a heat exchanger 50 for passing in indirect heat transfer relationship a gas stream in line 52 in fluid flow communication with the line 10 with a process fluid, such as a cold heat transfer fluid introduced by line 54 into the heat exchanger 50. A heated process fluid is withdrawn by line 56 from the heat exchanger 50 and is passed to an in-plant processing unit (not shown). The gas stream at a lower temperature level of from 490° to 590° F. is withdrawn by line 58 from the heat exchanger 50 and passes to the suction side of the induced draft fan 20 under the control of controller assembly 60 and returned by line 62 to line 10. The controller assembly 60 may control the speed of a motor 64 driving the induced draft fan 20, or alternately modulate gas flow in the inlet line 58 or the outlet line 62 to and from the induced draft fan 20 by a damper 66 or 68, respectively, positioned in line 58 or 62. A line 70 under the control of valve 72 is connected to the line 62 and to line 10 upstream of the line 52 to provide recirculation capability as more fully hereinafter discussed.

The heat exchanger assembly 16 includes serially disposed heat exchangers 74, 76 and 78 for passing in indirect heat transfer relationship a gas stream in line 80 in fluid communication with the line 10 with a process fluid, such as water introduced by line 82 into the heat exchanger 78 and thence for serial passage through the heat exchangers 74 and 76. A heated process fluid, such as superheated steam is withdrawn by line 84 from the heat exchanger 74 and is passed to in-plant processing unit(s) (not shown). The gas stream at a lower temperature level of from 310° to 410° F. is withdrawn by line 86 from the heat exchanger 78 and passes to the suction side of the induced draft fan 22 under the control of controller assembly 88 and returned by line 90 to line 10. The controller assembly 88 may control the speed of the motor 92 driving the induced draft fan 22, or alternately modulate the gaseous flow in the inlet line 86 or the outlet line 90 to and from the induced draft fan 22 by a damper 94 or 96, respectively, positioned in line 86 or 90.

The gas stream in line 24 at a much lower temperature level, i.e. 310° to 410° F. as hereinabove discussed may be passed in indirect heat transfer in heat exchanger 26 with a process stream in line 98, such as boiler feed water, steams, or super heated steam to recover the residual heat potential of the gas in line 24 prior to venting to the atmosphere.

EXAMPLE OF THE INVENTION

Operation of the apparatus of the present invention is illustrated in the following example which is intended to be merely illustrative and the invention is not to be regarded as limited thereto.

EXAMPLE I

A hot gas stream (500,000 lb/hr.) at a temperature of 950° F. is passed through the heat exchanger 12, 14 and 16 in indirect heat transfer relationship to heat fluids, as set forth in Table I, below:

| Heat Exchanger Assembly | Recovered Heat Potential M Btu hr. | Process Fluid | Inlet T(°F.) | Return T(°F.) | Quantity ($10^3$-#/hr.) |
|---|---|---|---|---|---|
| 12 | 21.6 | *htf | 950 | 750 | 400 |
| 14 | 10.8 | *htf | 790 | 590 | 200 |
| 16 | 20.25 | Water | 710 | 410 | 250 |

*htf = heat transfer fluid.

The gas stream is line 24 at a temperature of 560° F. may be subjected to further heat transfer in the heat exchanger 26.

In accordance with the present invention, the heat potential of a gas stream may be readily recovered in a facile manner with the following advantages:

1. If the source of the hot gaseous stream is a gas turbine, the gas turbine may operate more efficiently since there will be negligible back pressure on the gas turbine exhaust;
2. The heat exchangers recovering the heat potential are readily controlled by controlling the speed of the motor driving the induced draft fan, or alternately by controlling gas flow to or from the induced draft fan;
3. A heat exchanger assembly may be taken out of service without closing down the source of the hot gas stream, e.g., gas turbine;
4. Greater flexibility since the heat exchanger may function in a once through or recirculation capacity mode; and
5. In a recirculation mode, any heat exchanger assembly may be provided with higher gas flow at a lower temperature than once through which would be of significance with temperature sensitive materials.

While the apparatus of the present invention has been described with three different forms of heat transfer assemblies, i.e. once through, recirculation and serially arrayed process heat exchangers, it will be understood that the heat exchanger assemblies may be of like form as understood by one skilled in the art.

I claim:

1. A heat recovery system for recovering system for recovering the heat potential of a gas stream, which comprises:
   a gas turbine producing an exhaust gas stream having a temperature of from 500° to 2500° F.;
   a common conduit for said exhaust gaseous stream;
   a plurality of heat exchanger assemblies for recovering said heat potential from said exhaust gaseous stream at descending temperature levels;
   an induced draft fan associated with each heat exchanger assembly of said plurality of heat exchanger assembles for effecting flow of said exhaust gaseous stream through an associated heat exchanger assembly;
   conduit means for each of said heat exchanger assemblies for withdrawing said exhaust gaseous system from said common conduit and introducing same into said associated heat exchanger assembly;
   conduit means for each of said heat exchanger assemblies for passing to said common conduit said exhaust gaseous stream withdrawn from said associated heat exchanger assembly; and
   conduit means for venting to atmosphere a waste gaseous stream from said common conduit.

2. The heat recovery system as defined in claim 1 wherein said induced fan is motor driven and flow of gas through an associate heat exchanger assembly is controlled by speed of said motor.

3. The heat recovery system as defined in claim 1 wherein flow of said gas stream through an associated induced draft fan is controlled by a damper connected to an inlet to said induced draft fan.

4. The heat recovery system as defined in claim 1 wherein flow of said gas stream through an associated induced draft fan is controlled by a damper connected to an outlet from said induced draft fan.

5. The heat recovery system as defined in claim 1 and further including conduit means for returning a portion of said gas stream passing through heat exchanger assembly upstream of said conduit means for introducing said gas stream into said heat exchanger assembly.

6. The heat recovery system as defined in claim 1 wherein said heat exchanger assembly includes a plurality of heat exchangers in series relationship to flow of said gas stream.

* * * * *